US006187405B1

(12) United States Patent
Rudin

(10) Patent No.: US 6,187,405 B1
(45) Date of Patent: Feb. 13, 2001

(54) PAPER AND METHOD FOR DISPLAYING MULTIPLE PAGE IMAGES

(75) Inventor: Todd Jay Rudin, Campbell, CA (US)

(73) Assignee: Todd Rudin, Santa Clara, CA (US)

( * ) Notice: Under 35 U.S.C. 154(b), the term of this patent shall be extended for 0 days.

(21) Appl. No.: 09/178,722

(22) Filed: Oct. 24, 1998

(51) Int. Cl.[7] ...... C09J 7/02

(52) U.S. Cl. ...... 428/43; 428/40.1; 428/42.2; 428/42.3; 428/355 RA

(58) Field of Search ...... 428/43, 42.2, 42.3, 428/355 RA, 40.1

(56) References Cited

U.S. PATENT DOCUMENTS

| | | | | |
|---|---|---|---|---|
| 2,304,787 | | 12/1942 | Avery | 154/1 |
| 3,993,814 | | 11/1976 | Cavender | 428/40 |
| 4,033,611 | | 7/1977 | Johnsen | 283/6 |
| 4,515,077 | | 5/1985 | Davidson et al. | 101/127 |
| 4,637,635 | | 1/1987 | Levine | 283/101 |
| 4,783,354 | | 11/1988 | Fagan . | |
| 4,814,216 | | 3/1989 | Brunette et al. | 428/43 |
| 4,878,613 | | 11/1989 | Badger et al. | 229/75 |
| 4,895,746 | | 1/1990 | Mertens . | |
| 4,952,433 | | 8/1990 | Tezuka et al. | 428/42 |
| 4,985,302 | | 1/1991 | Sala et al. . | |
| 5,033,252 | | 7/1991 | Carter | 53/425 |
| 5,090,733 | | 2/1992 | Bussiere | 283/2 |
| 5,129,682 | | 7/1992 | Ashby | 283/81 |
| 5,132,915 | | 7/1992 | Goodman | 364/479 |
| 5,139,836 | | 8/1992 | Burke | 428/42 |
| 5,147,699 | | 9/1992 | Browning et al. | 428/40 |
| 5,182,152 | | 1/1993 | Ericson | 428/42 |
| 5,192,612 | | 3/1993 | Otter et al. . | |
| 5,194,299 | | 3/1993 | Fry . | |
| 5,200,242 | | 4/1993 | Hohmann | 428/40 |
| 5,209,514 | | 5/1993 | Hebert | 283/81 |
| 5,227,209 | | 7/1993 | Garland | 428/40 |
| 5,382,055 | | 1/1995 | Mertens et al. | 283/67 |
| 5,389,414 | | 2/1995 | Popat . | |
| 5,407,718 | | 4/1995 | Popat et al. . | |
| 5,571,587 | * | 11/1996 | Bishop et al. | 428/43 |
| 5,618,062 | | 4/1997 | Mertens et al. . | |
| 5,662,976 | | 9/1997 | Popat et al. . | |
| 5,721,178 | * | 2/1998 | Lalande | 428/43 X |
| 5,853,837 | * | 12/1998 | Popat | 428/43 |
| 5,985,075 | | 11/1999 | Freedman | 156/229 |
| 5,997,683 | | 12/1999 | Popat | 156/277 |

OTHER PUBLICATIONS

Epson Accessories, Inc., "Self-Adhesive Sheets, 8.3"x11.7", 10 Sheets", 1 page, downloaded from website http//www.epson.com, on Jan. 17, 2000.

Epson Accessories, Inc., "Photo Sticker Kit", 1 page, downloaded from website http//www.epson.com, on Jan. 17, 2000.

Kodak, "Kodak Inkjet Photo Stickers", downloaded from website http://kodak.com, on Jan. 17, 2000.

* cited by examiner

*Primary Examiner*—Daniel Zirker
(74) *Attorney, Agent, or Firm*—Blakely, Sokoloff, Taylor & Zafman LLP

(57) ABSTRACT

A sheet assembly of an adhesive backed computer printer paper. The paper sheet is die cut (52) to allow an image area (50) to be separated from the margin (54). The paper is mounted on a backing sheet (58) that allows easy removal of the image area (50). The sheet assembly may be used in any computer printer. A method for using standard computers, software, and printers, for adjusting the margin (54), printing multiple page images on multiple sheets and displaying the images. Using standard, full page envelopes, multiple page images can be mailed then assembled for viewing at a remote location.

10 Claims, 13 Drawing Sheets

PAPER AND METHOD FOR DISPLAYING MULTIPLE PAGE IMAGES

FIELD OF INVENTION

This invention relates to adhesive backed printer paper, specifically to an improved paper and method for combining multiple sheets to display an arbitrarily large image.

DESCRIPTION OF PRIOR ART

The personal computer revolution has provided exceptional capabilities for creating, manipulating, and printing both graphics and text. Most of the software available allows images of an arbitrary size to be created and manipulated. Large images can be scrolled or resized while on the computer screen. Images smaller than a single sheet of printer paper can easily be printed on paper. If an image is larger than the size of a single sheet of printer paper the image is generally split across multiple pages. It is difficult to combine the multiple page output to form a single image for display. The method most commonly used is to cut the borders off each sheet then tape the individual sheets together to form the complete image. This process is not easy and without an excellent technique the results are usually less than perfect. Many times images are reduced to fit the paper size, even if the image would be better viewed in a larger format.

There are printers available that accept large paper sizes but they are generally expensive and not in common use. Even with a large printer it is always possible to desire an output size larger than any single sheet size. If a large output is produced and it is desired to send it to another location, the large output will need to be placed into a special mailing tube or folded before being mailed. The tube is expensive and folding causes creases.

The most common printers accept standard letter size paper or slightly larger. Most printers are unable to print across the entire sheet of the paper, leaving one or more edges blank. These properties make it necessary to cut the blank paper away before multiple sheets can be combined.

There is printer paper with adhesive backing available, but most of the adhesive backed paper is designed to be used as labels or in a manner that divides the full sheet into smaller pieces. Letter size adhesive backed paper for use in computer printers and copy machines is available with either permanent or repositionable adhesive. By using adhesive backed paper, multiple sheets can be combined, on a suitable surface, after cutting the blank borders off. This eliminates the need to tape together the individual sheets when forming a multiple sheet image. Still, the process of combining multiple sheets to form a single image is difficult due to the fact that the borders need to be accurately cut from each edge to allow precise placement of the sheets.

OBJECTS AND ADVANTAGES

Accordingly, there are several objects and advantages of my invention. The first object is to provide paper that can be used in computer printers to output a single image across multiple sheets, which can then be easily combined to display the single image. The second object is paper that after having sections of a single image printed on it can have the blank borders easily removed for allowing multiple sheets to be combined to form the single image. The third object is paper that has adhesive backing to allow multiple sheets to be combined easily on various surfaces for display of a single image. The fourth object is to allow ease of repositioning and removal of paper from a surface that the sheets are placed on. The fifth object is to provide a method for printing multiple sheet images using standard computers, printers, and software. The sixth object is to allow the mailing of multiple page images in standard sheet size envelopes.

Further objects and advantages of my invention will become apparent from a consideration of the drawings and ensuing description.

DESCRIPTION OF DRAWINGS

FIG. 1 is a front view of a sheet of paper with a die cut, adhesive, and backing sheet, one corner of the image area is lifted.

FIG. 2 is a sectional view taken along section 2—2 of FIG. 1 showing the paper, adhesive, and backing sheet.

FIG. 3 is a rear view of a sheet of paper showing the backing sheet.

FIGS. 4 to 7 are front views of sheets of paper with a partial image printed on each sheet.

FIG. 8 is a front view of an image created by combining the four partial images in FIGS. 4 to 7, attached to a sheet of cardboard.

FIG. 9 is a front view of a sheet of paper with perforations, adhesive, and backing sheets; one corner of the image area is lifted.

FIG. 10 is a sectional view taken along section 10—10 of FIG. 9 showing the paper, adhesive, and backing sheets.

FIG. 11 is a rear view of a sheet of paper showing the backing sheets.

FIGS. 12 to 15 are front views of sheets of paper with a partial image printed on each sheet.

FIG. 16 is a front view of an image created by combining the four partial images in FIGS. 12 to 15, attached to a sheet of cardboard.

REFERENCE NUMERALS IN DRAWINGS

Figure 1:
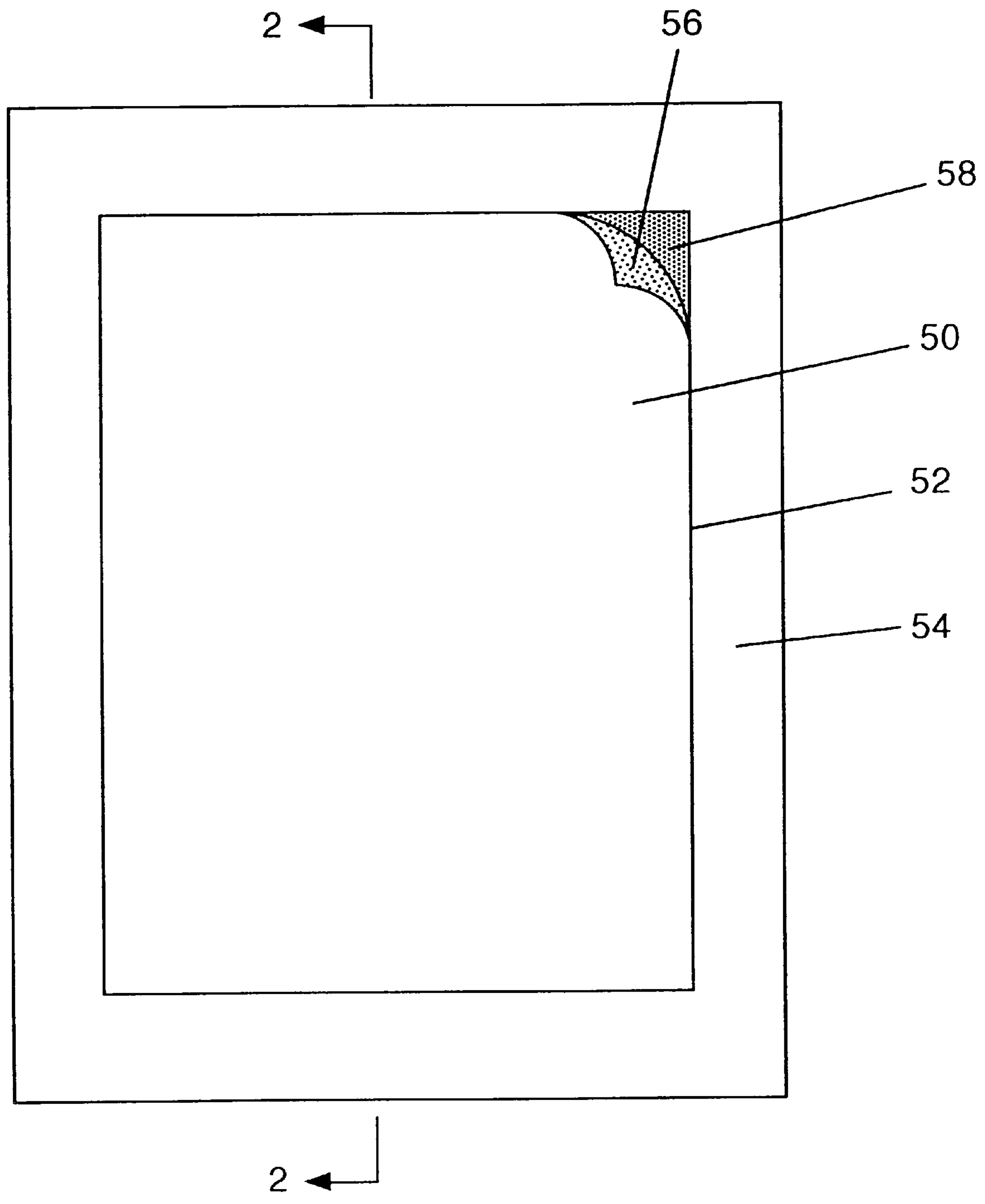
FIGS. 1 to 8 are depicting the first embodiment.

50 image area of paper
52 die cut
54 margin area of paper
56 adhesive
58 backing sheet
60 top left section of image, printed on image area
62 top right section of image, printed on image area
64 bottom left section of image, printed on image area
66 bottom right section of image, printed on image area
68 cardboard
70 image area of paper, second embodiment
72 perforation
74 margin area of paper, second embodiment
76 adhesive, second embodiment
78 backing sheets, second embodiment
80 top left section of image, printed on image area, second embodiment
82 top right section of image, printed on image area, second embodiment 84 bottom left section of image, printed on image area, second embodiment 86 bottom right section of image, printed on image area, second embodiment 88 cardboard 90 test image, used for setting the margins Description-FIGS. 1 to 8 and 17

Figure 2:
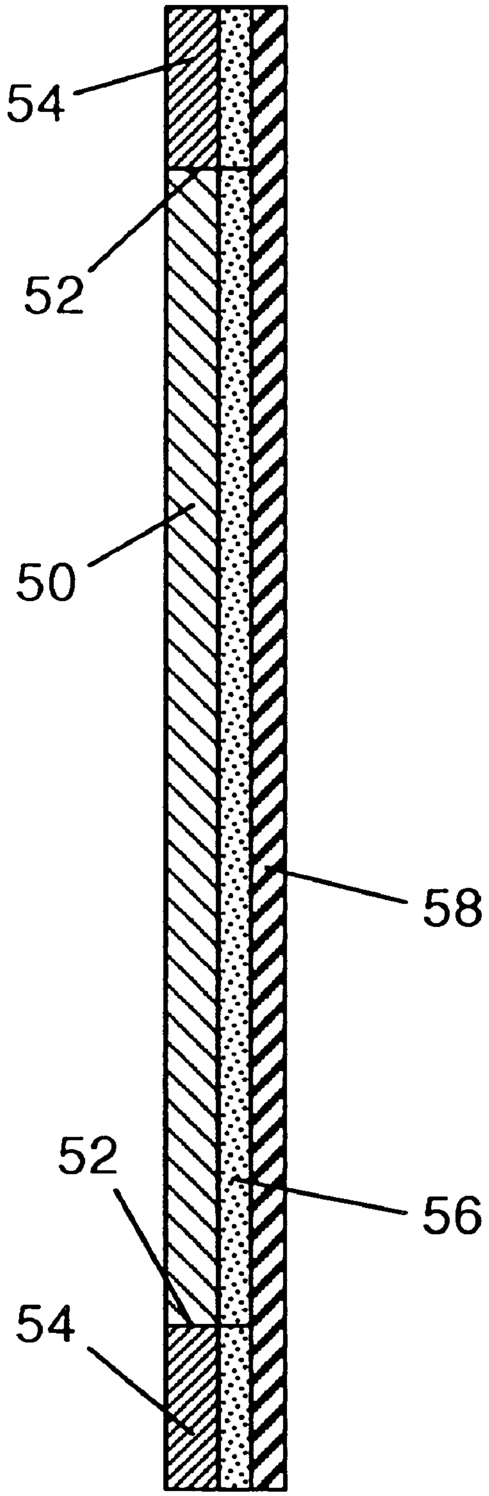
Figure 3:
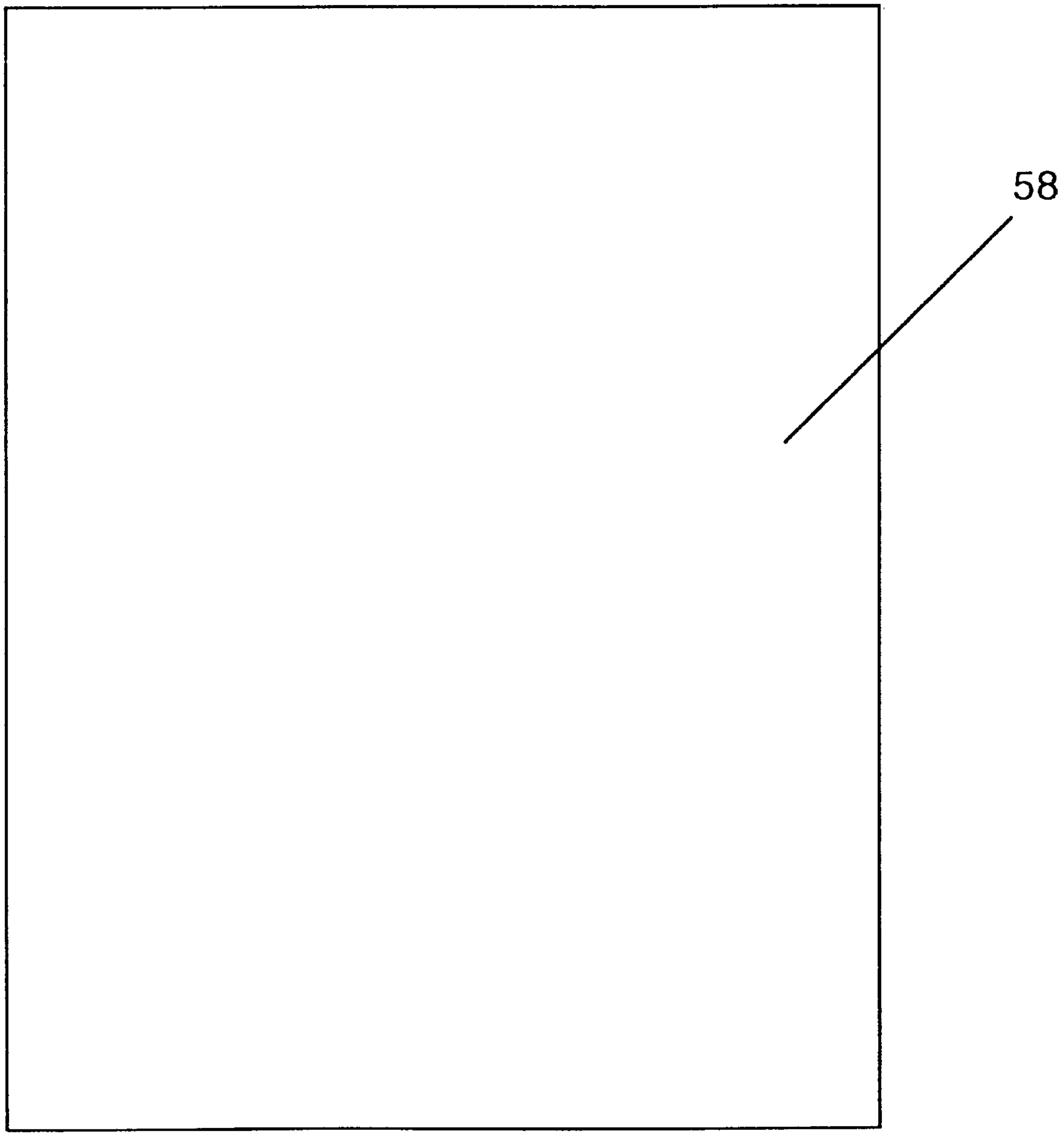

A first embodiment of the paper is illustrated in FIG. 1 (front view), FIG. 2 (sectional view), and FIG. 3 (rear view). A sheet of repositionable adhesive backed printer paper is available from Avery Dennison Corporation, Pasadena, Calif., under the trademarks Remove 'Em™ Laser Labels 6465™. The first embodiment is based on this or similar adhesive backed paper. The available repositionable paper consists of the backing sheet 58, attached to adhesive 56, attached to the back of a sheet of paper 21.59 cm. (8.5 in.) by 27.94cm (11 in.). There are no cuts on the available paper. To this existing paper, die cut 52 is placed in the paper 17.8 mm. (0.7 in.) from the top and bottom edges; 15.2 mm. (0.6 in.) from the left and right edges. The dimensions for the die cut 52 are for example only and not a limitation. A margin 54 is created that is sufficiently wide enough for most printers to print out to it. A center image area 50 of the paper is formed by the die cut 52. FIG. 1 shows the corner of the image area 50 lifted, revealing the adhesive 56 and the backing sheet 58.

The size of the paper may for example be any of the standard sizes; US Letter 21.59x27.94 cm (8.5x11 inches), Standard Legal 21.6x35.6 cm (8.5x14 inches), Short Legal 21.6x33 cm (8.5x13 inches), B 27.9x43.2 cm (11x17 inches), Super B 33x48.3 cm (13x19 inches), A2 42x59.4 cm (16.5x23.4 inches), A3 29.7x42 cm (11.7x16.5 inches), A4 21x29.7 cm (8.3x11.7 inches), or any other size within a range of sizes from 7.62x10.16 cm (3x4 inches) through 76.2x101.6 cm (30x40 inches). The placement of the die cut may for example be any distance from the edge of the paper greater than approximately 0.51 cm (0.2 inches).

Figure 4:
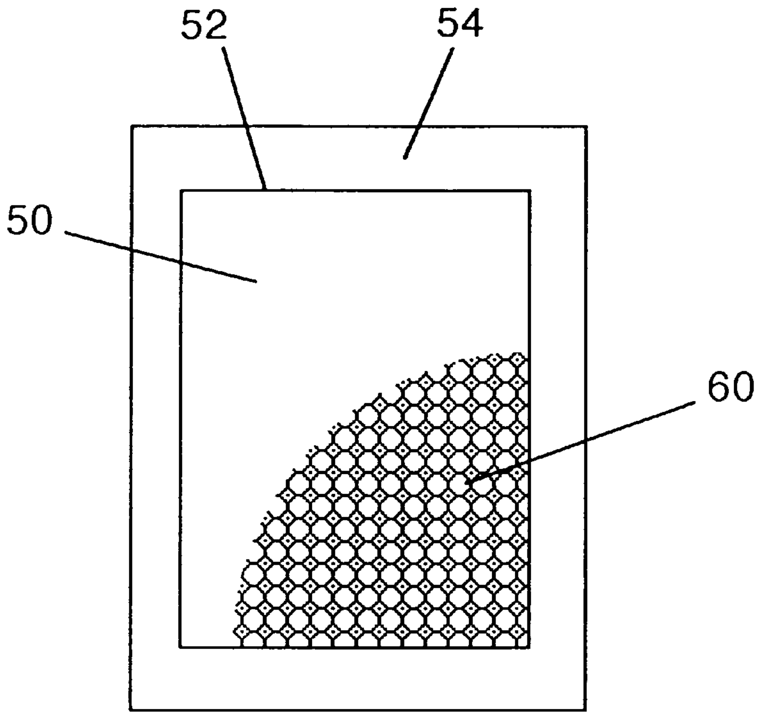
Figure 5:
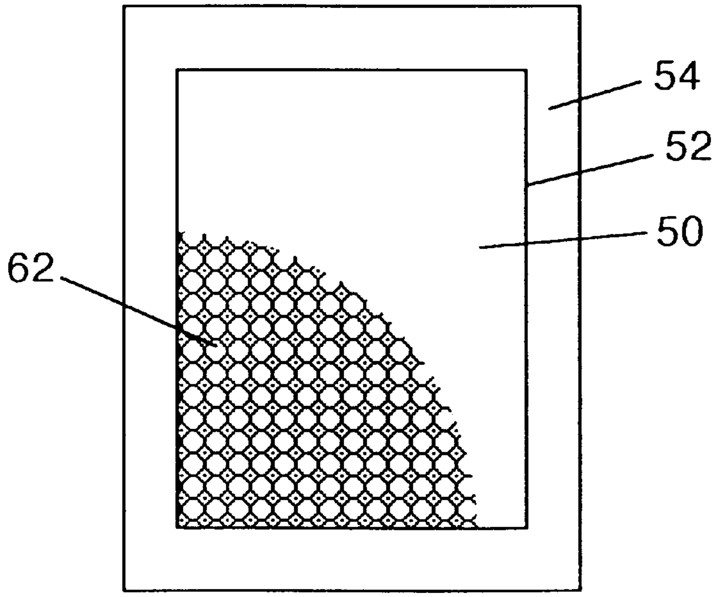
Figure 6:
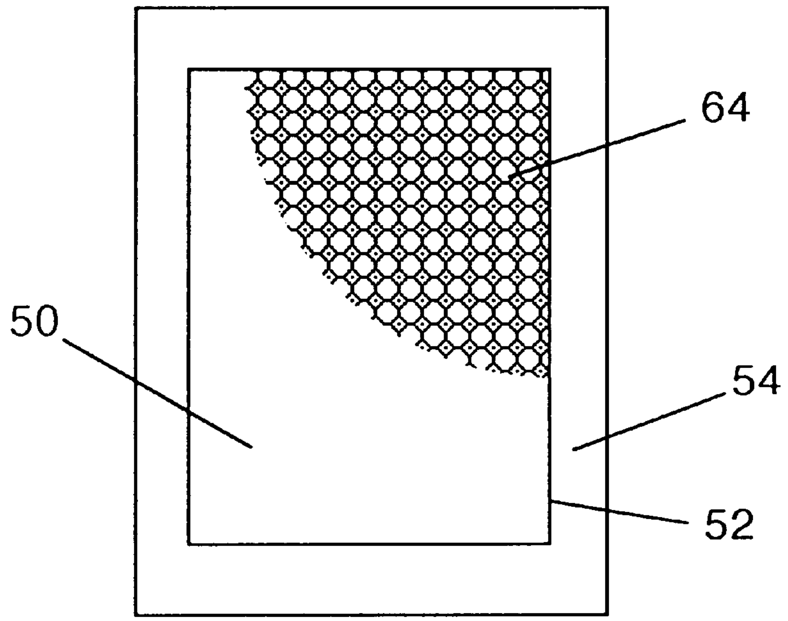
Figure 7:
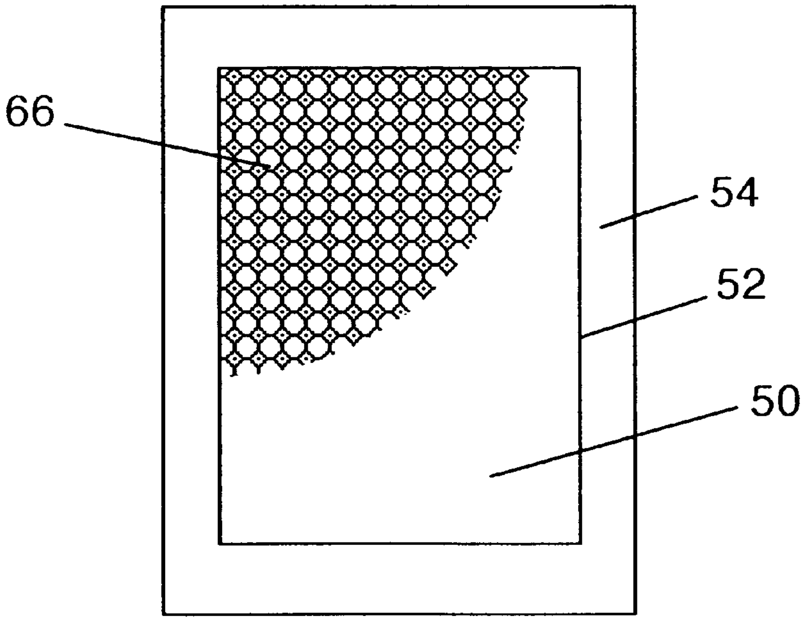
Figure 8:
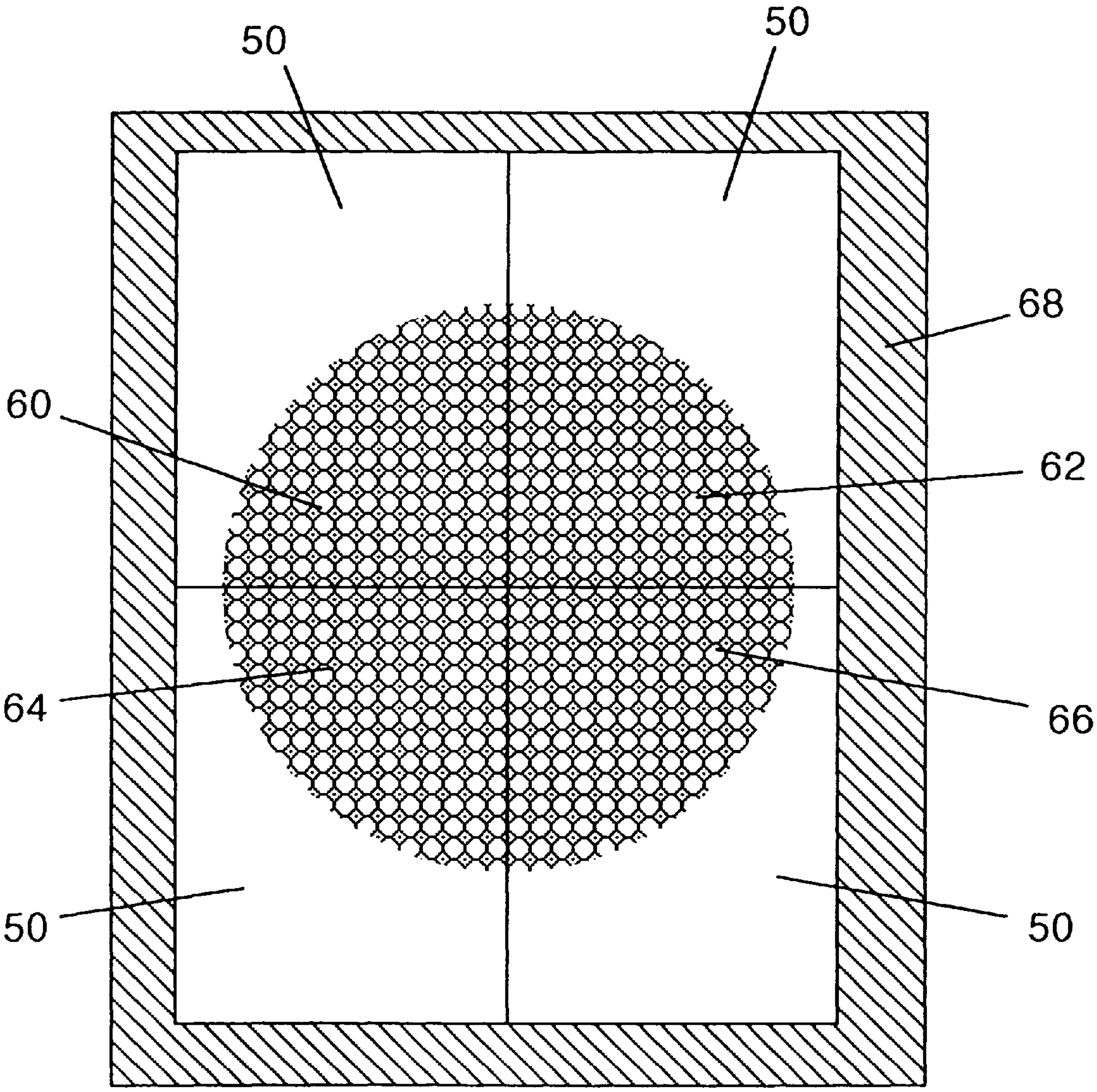

An example image of a circle, too large to fit on a single sheet of letter size paper, is shown in FIG. 8. This image, which takes four sheets to display, is illustrated printed on four sheets of the paper in FIGS. 4 to 7. FIG. 4 illustrates the top left section of the image 60, printed on a sheet of the paper. FIG. 5 illustrates the top right section of the image 62, printed on a sheet of the paper. FIG. 6 illustrates the bottom left section of the image 64, printed on a sheet of the paper. FIG. 7 illustrates the bottom right section of the image 66, printed on a sheet of the paper.

FIG. 8 is an illustration of the four image areas 50, of the paper in FIGS. 4 to 7, combined to form a full image of the circle. The four image areas 50 are shown attached to a sheet of cardboard 68, for display.

Figure 17:
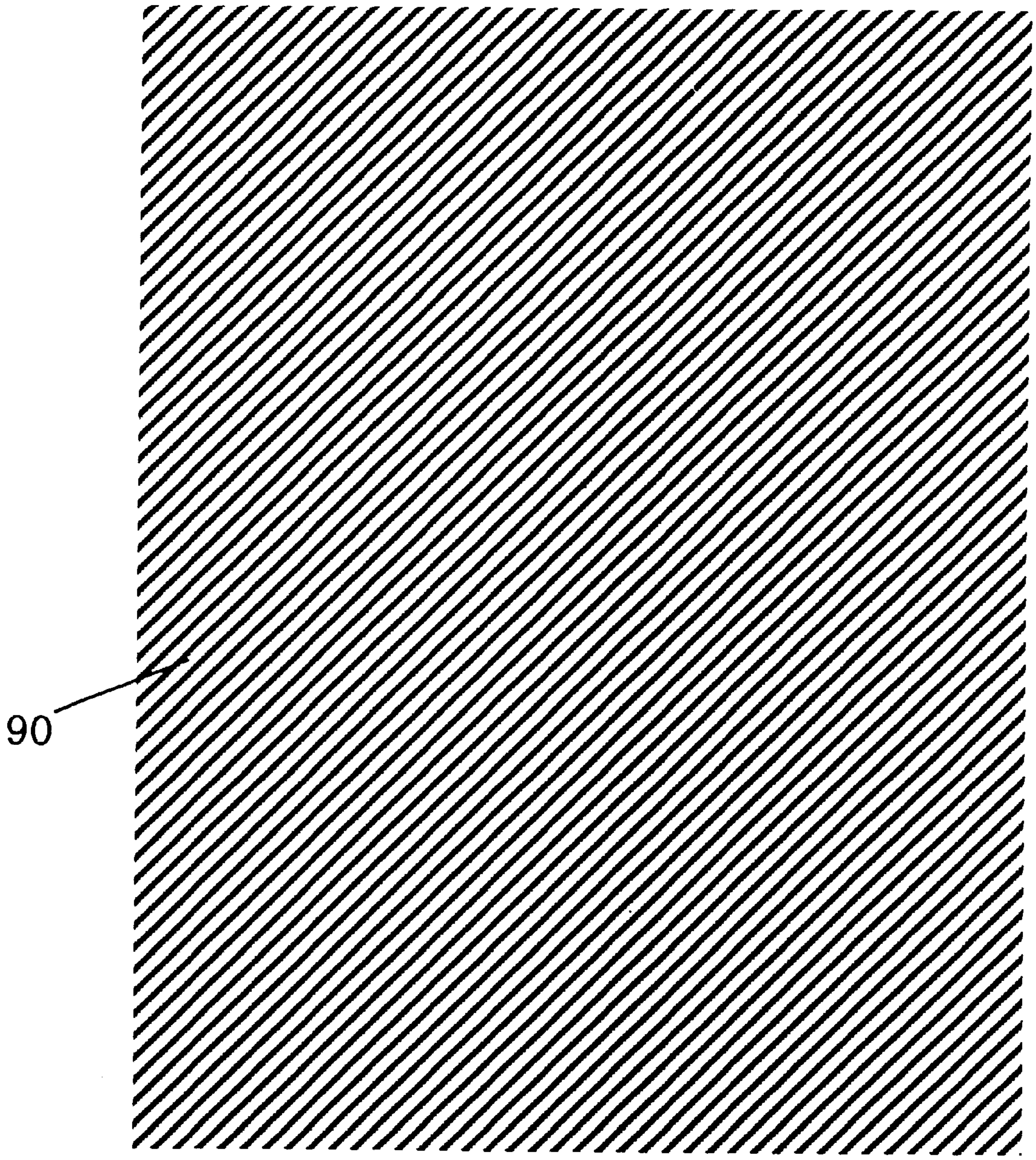
FIG. 17 is a test image, used for setting the margins.

FIG. 17 is an illustration of a test image 254 mm.x304.8 mm. (10 in.x12 in.) that is larger than a sheet of paper, both horizontally and vertically. The pattern rectangle allows the edges of the image area to be easily seen while adjusting the margins.

Operation-FIGS. 1, 4 to 8 and 17

From within any computer program that can adjust margin widths and handle images larger than a single page size, a multiple page output can be created. There are many programs on most personal computers that have these two features available.

Before printing the image the margins must be adjusted to place the image on the paper correctly. From within the computer application get a test image 90 to print. The test image 90 should be larger than one page, both horizontally and vertically. The test image should allow the edges of the image area 50 to be easily viewed. Set the left and right margins equal to 15.2 mm. (0.6 in.). Set the top and bottom margins equal to 17.8 mm. (0.7 in.). Place the paper in the printer. Since the printer is a mechanical device there may be variation between different printers as to where the actual image is placed on the paper. There may even be some variation from sheet to sheet on the same printer. The margins will need to be adjusted for each individual printer. This is an iterative process as described in the following step by step procedure.

Step 1. Print out only the first (top left) sheet.

Step 2. Measure the top and left margins. The margins may not be parallel to the edge of the paper. Take the measurements from where the margin is the widest.

Step 3. Determine the adjustment needed for the top margin by taking the desired value, 17.8 mm. (0.7 in.), and subtracting the measured value from it. Add this correction to the current value of the top margin setting.

Step 4. Determine the adjustment needed for the left margin by taking the desired value, 15.2 mm. (0.6 in.), and subtracting the measured value from it. Add this correction to the current value of the left margin setting.

Step 5. Print out only the first (top left) sheet again.

Step 6. Measure the top and left margins again. If the measured values are equal to the desired values then go to step 7. If there needs to be further adjustment go back to step 3.

Step 7. If the printer being used is very accurate in its paper handling tolerances then the top and left margins are now set correctly. To compensate for sheet to sheet paper movement subtract 0.5 mm. (0.02 in.) from both the top and left margins. This amount may be less or more depending on the individual printer. The smaller this correction the better the final image results will look.

Step 8. Print out only the first (top left) sheet again.

Step 9. Measure the bottom and right margins. The margins may not be parallel to the edge of the paper. Take the measurements from where the margin is the widest.

Step 10. Determine the adjustment needed for the bottom margin by taking the desired value, 17.8 mm. (0.7 in.), and subtracting the measured value from it. Add this correction to the current value of the bottom margin setting.

Step 11. Determine the adjustment needed for the right margin by taking the desired value, 15.2 mm. (0.6 in.), and subtracting the measured value from it. Add this correction to the current value of the right margin setting.

Step 12. Print out only the first (top left) sheet again.

Step 13. Measure the bottom and right margins again. If the measured values are equal to the desired values then go to step 14. If there needs to be further adjustment go back to step 8.

Step 14. If the printer being used is very accurate in its paper handling accuracy then the bottom and right margins are now set correctly. To compensate for sheet to sheet paper movement subtract 0.5 mm. (0.02 in.) from both the bottom and right margins. This amount may be less or more depending on the individual printer. The smaller this correction the better the final image results will look.

Step 15. The margin settings for the computer and printer setup have now been determined. Save the results for future use. As long as the same computer setup is used the margin settings obtained should remain valid and this procedure will not have to be repeated.

The margins for the paper are now set correctly. From within the computer application get the image (FIG. 8) to print. Print out all the pages of the image. Find a suitable smooth surface to display the full image. The surface could be a wall, window, mirror, wood, etc., as long as there is enough room to place the entire image. To keep the image portable, a piece of cardboard 68 is used. Remove the image area 50 from the backing 58 and border 54 of the first (top left) sheet (FIG. 4). Place the image area 50 on the cardboard 68. It will adhere to the cardboard 68 due to the adhesive 56. Remove the image area 50 from the next (top right) sheet (FIG. 5). Place it to the right of the first sheet on the cardboard 68. The edges should align exactly. If the second sheet needs to be repositioned, it can be lifted and placed again. Remove the image area 50 from the next (bottom left) sheet (FIG. 6). Place it under the first sheet. The edges should align exactly. Reposition the sheet if needed. Remove the image area 50 from the next (bottom right) sheet (FIG. 7). Place it in the bottom right position. The edges should align exactly. Reposition the sheet if needed. The image (FIG. 8) is now complete.

If the image needs to be mailed, a standard full page envelope can be used. Since the image is made up of multiple standard size sheets, after printing the sheets, they can be placed in a standard full sheet envelope and mailed. The person receiving the image can then put the image together.

Description-FIGS. 9 to 16

Figure 9:
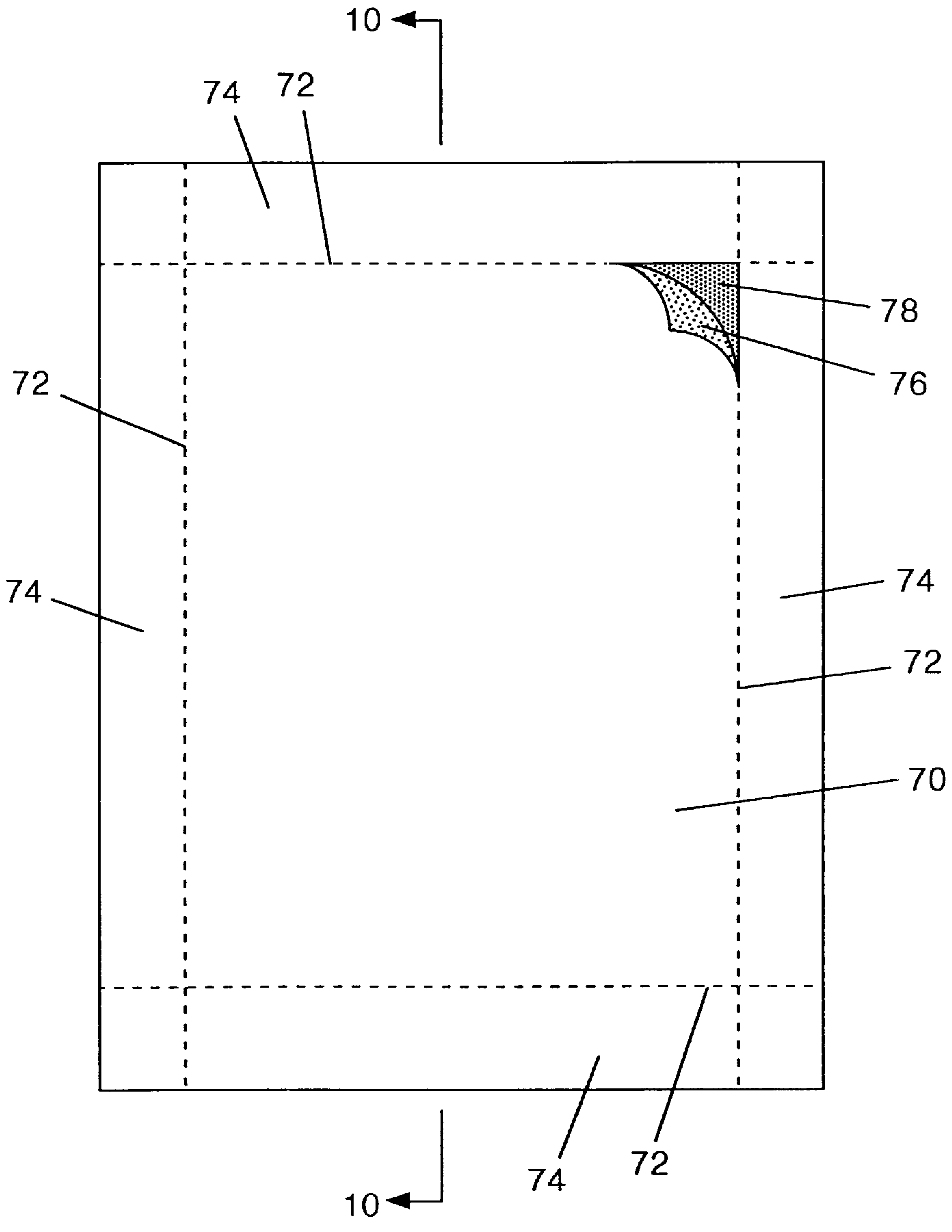
FIGS. 9 to 16 are depicting the second embodiment.
Figure 10:
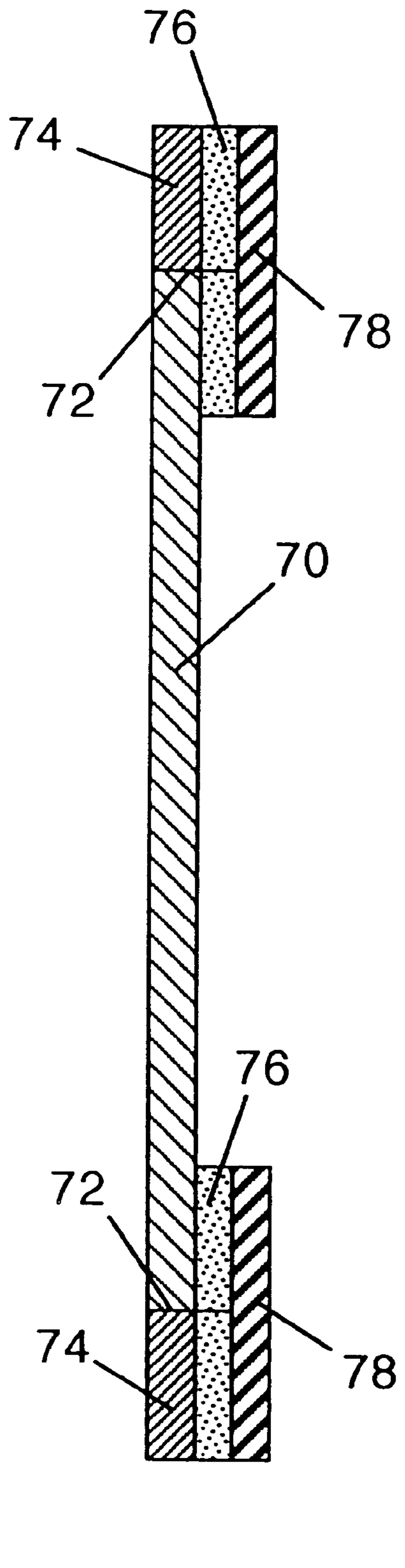
Figure 11:
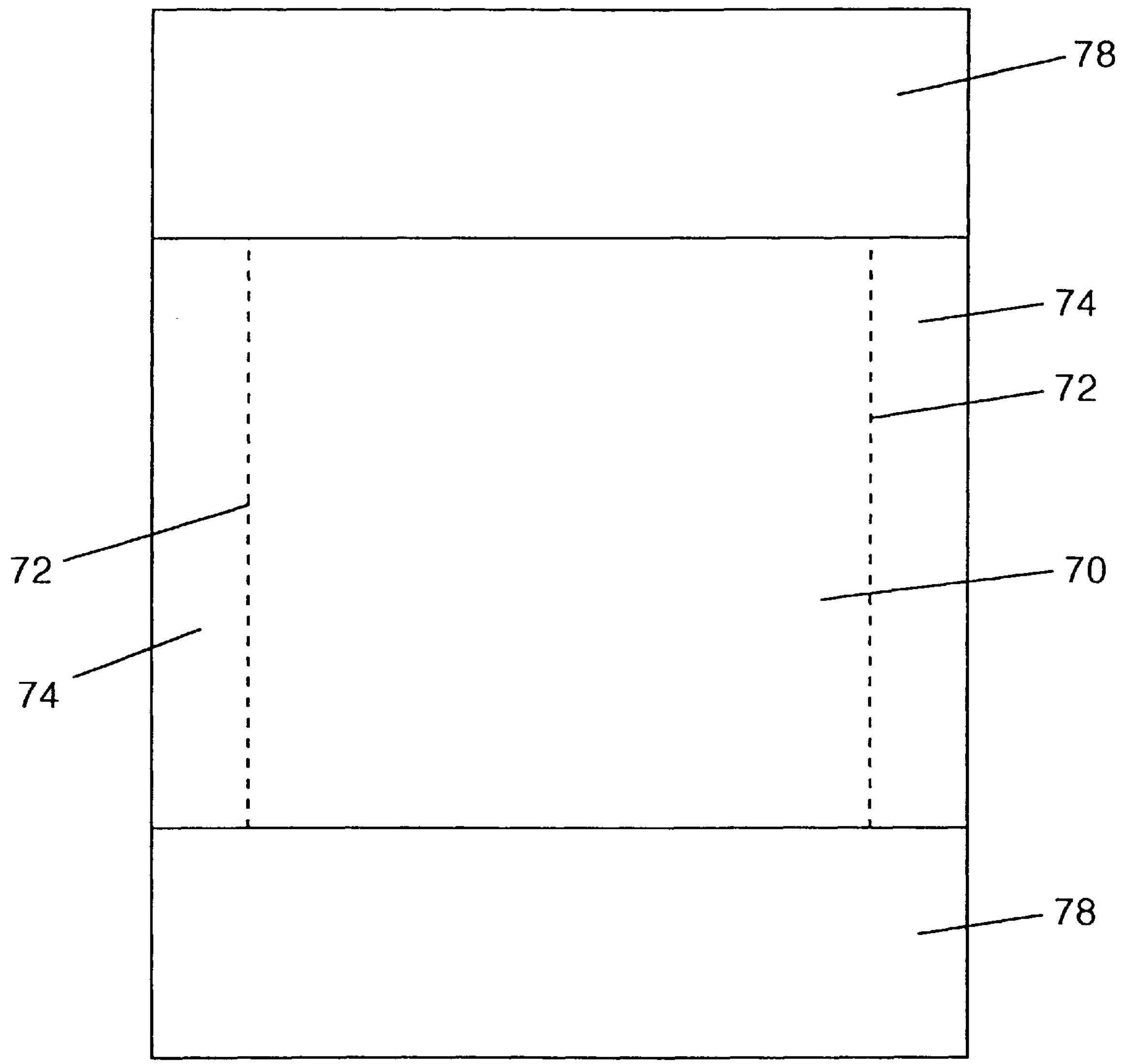

A second embodiment of the paper is illustrated in FIG. 9 (front view), FIG. 10 (sectional view), and FIG. 11 (rear view). A sheet of repositionable adhesive backed printer paper is available from Minnesota Mining and Manufacturing Company, St. Paul, Minn., under the trademark Post-it™ Signs. The second embodiment of the invention is based on this or similar adhesive backed paper. The available repositionable paper consists of the two backing sheets 78, attached to adhesive 76, attached to the back of a sheet of paper 21.59 cm. (8.5 in.) by 27.94 cm (11 in.). There are no cuts on the available paper. To this existing paper, perforations 72 are placed in the paper 17.8 mm. (0.7 in.) from the top and bottom edges; 15.2 mm. (0.6 in.) from the left and right edges. The dimensions for the perforations 72 are for example only and not a limitation. A margin 74 is created that is sufficiently wide enough for most printers to print out to it. A center image area 70 of the paper is formed by the perforations 72. FIG. 9 shows the corner of the image area 70 lifted, revealing the adhesive 76 and the backing sheet 78.

The size of the paper may for example be any of the standard sizes; US Letter 21.59×27.94 cm (8.5×11 inches), Standard Legal 21.6×35.6 cm (8.5×14 inches), Short Legal 21.6×33 cm (8.5×13 inches), B 27.9×43.2 cm (11×17 inches), Super B 33×48.3 cm (13×19 inches), A2 42×59.4 cm (16.5×23.4 inches), A3 29.7×42 cm (11.7×16.5 inches), A4 21×29.7 cm (8.3×11.7 inches), or any other size within a range of sizes from 7.62×10.16 cm (3×4 inches) through 76.2×101.6 cm (30×40 inches). The placement of the perforations may for example be any distance from the edge of the paper greater than approximately 0.51 cm (0.2 inches).

Figure 12:
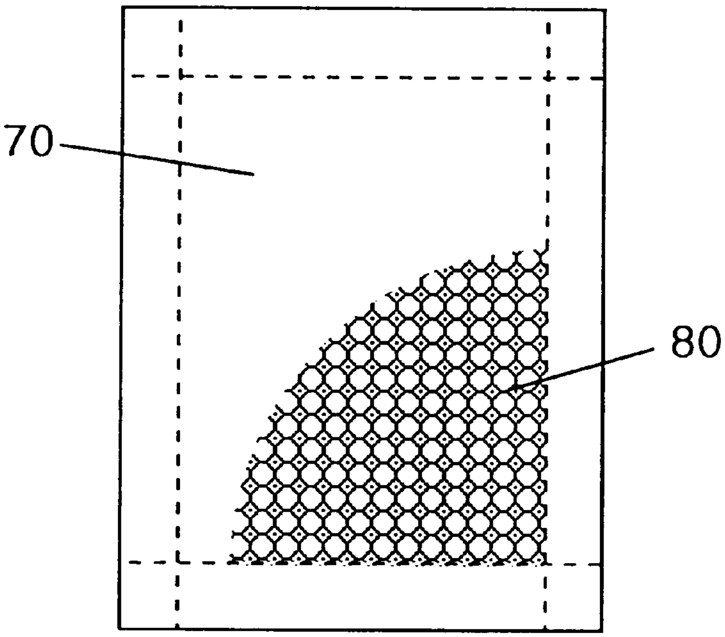
Figure 13:
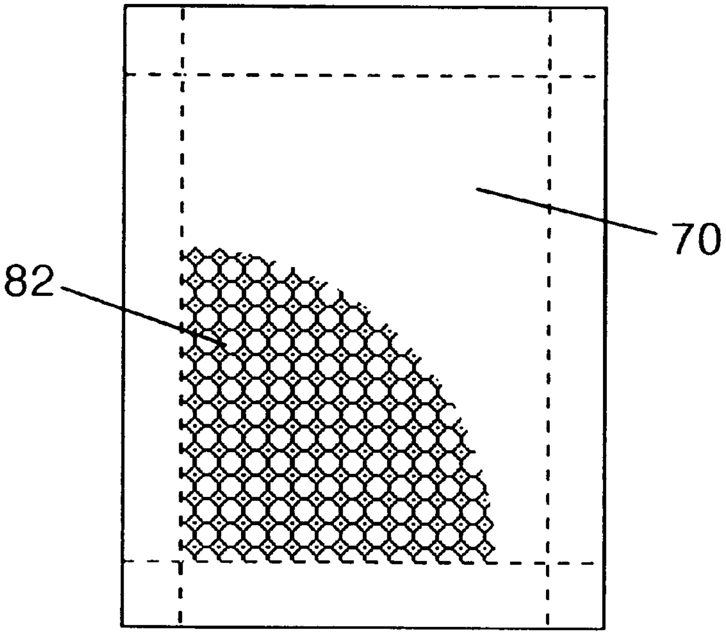
Figure 14:
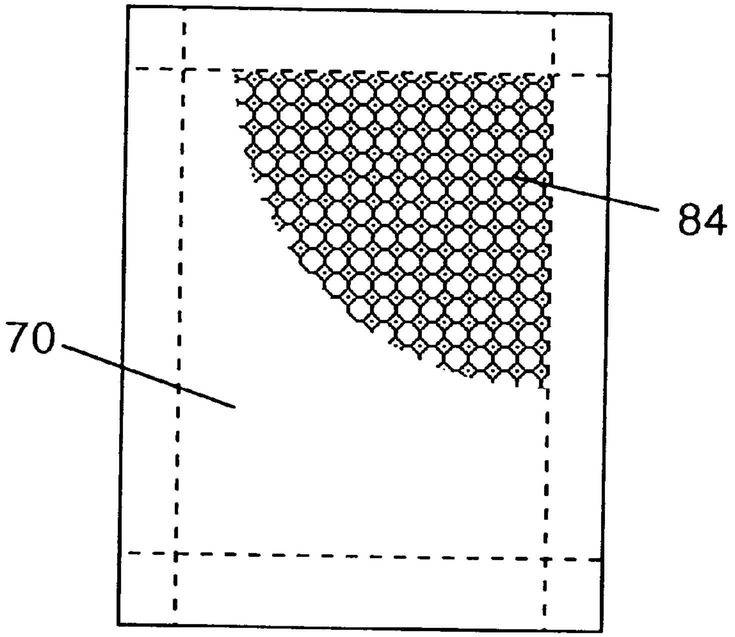
Figure 15:
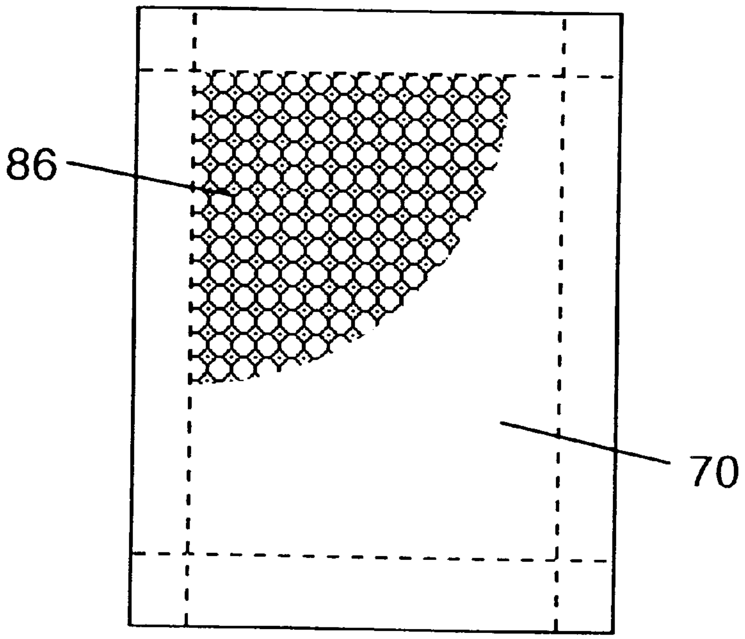
Figure 16:
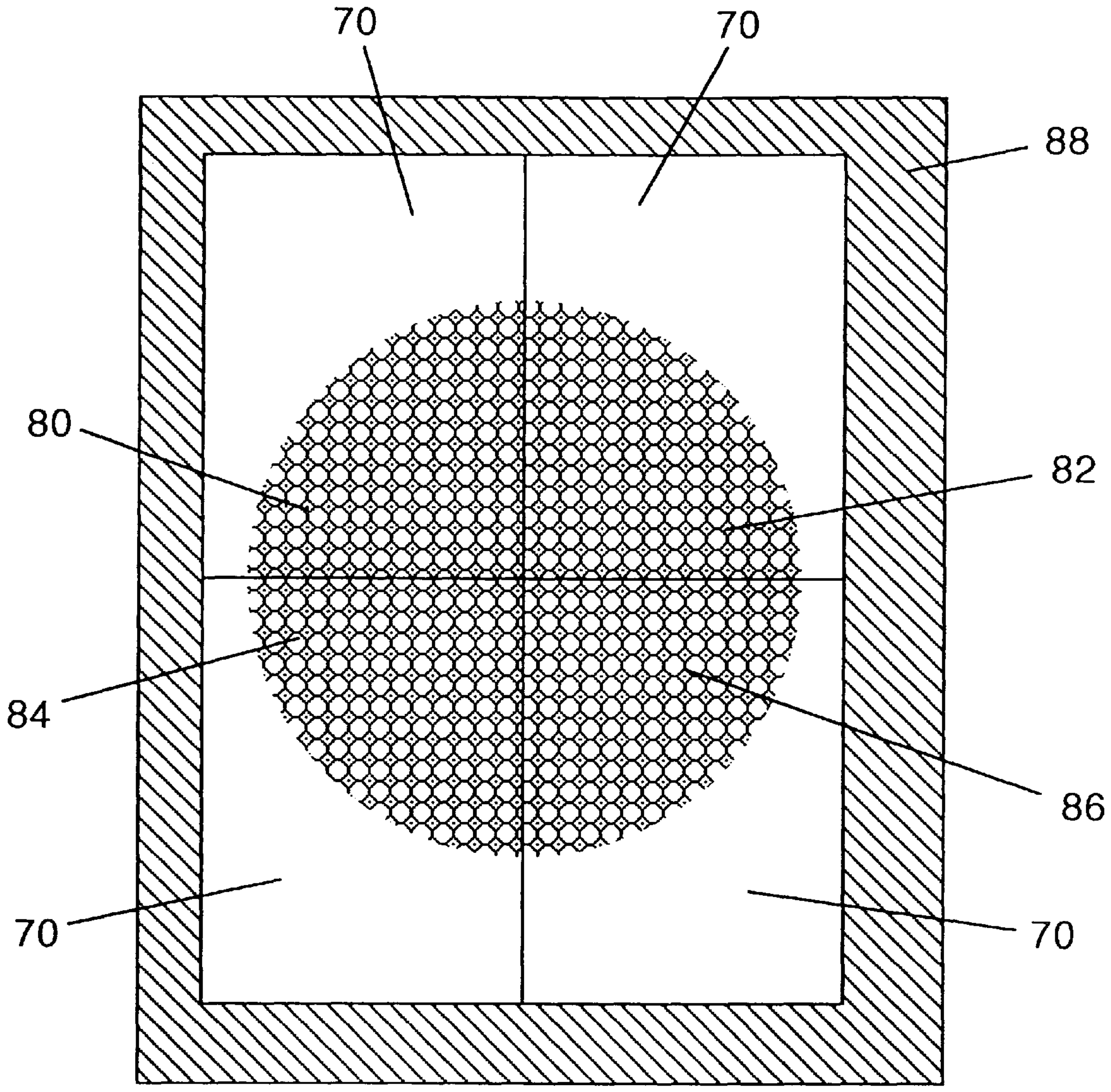

An example image of a circle, too large to fit on a single sheet of letter size paper, is shown in FIG. 16. This image, which takes four sheets to display, is illustrated printed on four sheets of the paper in FIGS. 12 to 15. FIG. 12 illustrates the top left section of the image 80, printed on a sheet of the paper. FIG. 13 illustrates the top right section of the image 82, printed on a sheet of the paper. FIG. 14 illustrates the bottom left section of the image 84, printed on a sheet of the paper. FIG. 15 illustrates the bottom right section of the image 86, printed on a sheet of the paper. FIG. 16 is an illustration of the four image areas 70, of the paper in FIGS. 12 to 15, combined to form a full image of the circle. The four image areas 70 are shown attached to a sheet of cardboard 88, for display.

Operation-FIGS. 9, 12 to 17

The operation of the second embodiment is similar to the operation of the first embodiment. The only difference is how the image area 70 is separated from the paper. The backing sheets 78 are removed from the back of the paper, then image area 70 is separated from the border 74 by tearing along the perforations 72.

The test image (FIG. 17) is used to adjust the margins. FIGS. 12 to 15 are then printed and combined to form the image (FIG. 16).

SUMMARY, RAMIFICATIONS, AND SCOPE

Accordingly, the reader will see that the multiple page output paper can be used to allow common computers, software, and printers to output images of an arbitrary large size. Additionally the printed sheets can be mailed in standard page size envelopes, for assembly and display at the destination.

Although the description above contains many specificities, these should not be considered as a limitation on the scope of the invention, but rather as an exemplification of two preferred embodiments thereof. Many other variations are possible. For example, the paper size can have different dimensions; the margin size can be different; the paper can be any color, including transparent; the paper material can be plastic or fiber based; the adhesive can be any adhesive strength; the adhesive may be any color, including transparent; the paper surface can be any finish, such as glossy, matte, satin, and standard; the paper can be different thickness; The paper can be used in copy machines to make multiple copies of multiple page images; images may be pre printed on the paper.

Accordingly, the scope of the invention should be determined not by the embodiments illustrated, but by the appended claims and their legal equivalents.

I claim:

1. A sheet assembly for multiple sheet image display comprising:

a backing sheet having a release surface; and a generally rectangular paper sheet with four edges having a repositionable adhesive coating applied to a backside of the paper sheet, with the adhesive coating adjacent to the release surface of the backing sheet, the paper sheet having a plurality of cuts forming a single rectangular image area having edges defined by the one or more cuts, wherein (i) the plurality of cuts are positioned to permit a personal computer printer to print substantially up to the plurality of cuts within the image area, (ii) none of the plurality of cuts extend substantially into the image area and (iii) each of the cuts of the plurality of cuts is substantially parallel to at least one edge of the four edges.

2. The sheet assembly as defined in claim 1 wherein the sheet assembly has a size within a range of sizes from 7.62×10.16 cm (3×4 inches) through 76.2×101.6 cm (30×40 inches).

3. The sheet assembly as defined in claim 1 wherein the sheet assembly has a size approximately 21.59 cm (8.5 inches) wide by approximately 27.94 cm (11 inches) long.

4. The sheet assembly as defined in claim 1 wherein a distance between each edge of the four edges and an adjacent parallel cut of the plurality of cuts is greater than approximately 0.51 cm (0.2 inches).

5. The sheet assembly of claim 1, wherein the plurality of cuts do not extend through the backing sheet.

6. The sheet assembly of claim 1, wherein the plurality of cuts are formed using a die cutting apparatus.

7. The sheet assembly of claim 1, wherein the plurality of cuts are in the form of a series of perforations.

8. A method for using standard personal computer software, hardware, and printer to produce a multiple page image on a plurality of sheet assemblies each sheet assembly comprising a backing sheet or sheets having a release surface, a paper sheet having a repositionable adhesive coating thereon mounted on the backing sheet, with the adhesive abutting the release surface of the backing sheet, the paper sheet having a die cut or a plurality of perforations forming a single rectangular center image area having edges defined by the die cut or the perforations and a margin area, with the die cut or perforations extending through the paper sheet but not the backing sheet, the method comprising the steps of:

manipulating the multiple page image on the standard computer hardware with the standard software that allows printing margin adjustment;

adjusting the margins in the software used for image manipulation to conform each page of the multiple page image to the image area of the sheet assembly;

printing a complete image on the plurality of sheet assemblies in a standard computer printer.

9. The method defined in claim 8, further comprising the steps of:

removing the image area from each of the plurality of sheet assemblies;

placing each removed image area on a suitable surface to form the complete image.

10. A method for mailing the multiple page image generated by the method in claim 9 comprising the steps of:

stacking all the sheets of the multiple page image together;

placing the stack into a standard full sheet mailing envelope;

addressing the envelope;

affixing postage to the envelope;

mailing the envelope;

whereby the complete image may be assembled, and viewed at the destination.

* * * * *